WHITE NOISE GENERATOR UTILIZING CENTER-TAPPED SERIES CONNECTED IMPEDANCES

Filed Sept. 11, 1961

INVENTORS
Royal V. O'Reilly
Pierre J. Sundborg
BY
Pierce Scheffler & Parker
Attorneys

United States Patent Office 3,199,048

Patented Aug. 3, 1965

3,199,048

WHITE NOISE GENERATOR UTILIZING CENTER-TAPPED SERIES CONNECTED IMPEDANCES

Royal V. O'Reilly and Pierre J. Sundborg, Altadena, Calif., assignors to Colorsound Mfg. Co. Inc., Covina, Calif., a corporation of Alaska Filed Sept. 11, 1961, Ser. No. 137,399
10 Claims. (Cl. 331—69)

This invention relates to apparatus for generating an alternating current signal composed of all the frequencies within a wide frequency spectrum, all of which simultaneously generated frequencies have the same amplitude. This type of signal is sometimes referred to as "white noise," and the present invention may thus be referred to as a "white noise generator." The analogy indicates that the signal generated contains all the frequencies within the audio spectrum at equal amplitudes, as "white light" contains all the frequencies within the light spectrum at equal amplitudes.

The frequency band generated by the present invention is defined as that spectrum of frequencies which it produces with "flat" or non frequency-dependent amplitudes. This frequency band encompasses the very-low frequency sub-sonics, the entire audio frequency spectrum, the very-low and low frequency radio frequency bands, and extends into the medium frequency radio frequency band. A typical embodiment of the invention produces all the frequencies between one cycle per second and one million cycles per second.

A white noise generator in accordance with the invention may be put to numerous uses among which are the following:

(1) The testing and calibration of seismometers, seismographs, audio equipment, and radio receivers;

(2) The masking or swamping of the sensations of nervous apprehension and pain, as in dental audio analgesia;

(3) Through a similar swamping of the senses and masking of background noises, as a tranquilizer and sleep inducer;

(4) As a broad source of energy for a multiband telemetering transmission system;

(5) As a source of supersonic frequencies for a variety of remote control applications.

Thermal noise in resistance elements is caused by the thermal agitation and exchange of valence electrons in the atoms of the resistive unit. The mean-square value of thermal noise voltage in a resistance is given by the equation:

$$E^2=4kfRT \qquad \text{(Eq. 1)}$$

where, $E$=root-mean-square value of noise voltage
$k$=Boltzmann's constant=$1.38\times10^{-23}$ joules/degree Kelvin
$f$=bandwidth of noise in cycles per second
$R$=resistance of noise-generating resistor in ohms
$T$=absolute temperature in degrees Kelvin.

It is seen that any resistance having a temperature above absolute zero produces across its terminals a thermal noise signal. This effect has been noted in several prior issued United States patents such as No. 2,624,-836—Dicke; No. 2,671,896—De Rosa; and No. 2,913,-669—Hebert. The amplitude of thermal noise generated within a resistance is generally very small, and a large degree of amplification is required for practical use of this type of signal. Elaborate precautions against other noises and hum must be employed, as in United States Patent 1,968,164—Nyquist which relates to a wide-band noise generator. The system has the further disadvantages that the amplitude of the signal output is strongly dependent upon ambient temperature, and that the noise signal is liable to contain annoying clicks and pops due to random long-interval agitations within the noise generating resistance. The present invention overcomes all of the above mentioned disadvantages, and has several additional merits.

It has been found that when a direct current is passed through a resistance, a "carrier" noise signal equal to or significantly greater than that produced by thermal agitation is obtained. In carbon resistances, this noise is due to small rapid variations in resistance which are produced by voltage pressures operating between the individual granules of which the resistance is composed. These varying voltage pressures in effect cause a physical oscillation of the granules, one to another, which causes the junction resistances between them to vary, and thus the resistance of the entire component to vary in a random manner.

The amplitude of the carrier noise voltage generated within a carbon resistance through which a direct current is passed is dependent upon the granular nature of the resistance, in that it is inversely proportional to the tightness of packing of the carbon granules within the resistor body, and thus varies from one type or brand to another. The tightness of granule packing is in turn affected by the temperature of the resistance and the coefficient of thermal expansion of its confining casing. For this reason, the equation expressing the amplitude of the noise produced must contain qualitative factors which are empirically determined for the resistance element under consideration. The general equation for carrier noise is:

$$E^2=ckR^aT^bIf \qquad \text{(Eq. 2)}$$

where, $E$=root-mean-square value of noise voltage
$c$=empirical constant generally less than unity
$k$=Boltzmann's constant=$1.38\times10^{-23}$ joules/degree Kelvin
$R$=resistance of noise-generating resistance in ohms
$T$=absolute temperature of resistance in degrees Kelvin
$a$, $b$=empirical constants approximately equal to unity
$I$=current passed through resistance R in amperes
$f$=bandwidth of noise in cycles per second.

Thus it is clear that the amplitude of the noise signal produced by a resistance through which a direct current is passed is given by the sum of Equations 1 and 2:

$$E^2=kf(4RT+cR^aT^bI) \qquad \text{(Eq. 3)}$$

It is known that when a direct current is passed through a semiconductor rectifying diode in the backward or least-conductive direction, a noise signal whose amplitude may be represented by Equation 3 is produced. This phenomenon is described in United States Patent 2,624,836—Dicke. The use of a single diode as a noise generating source has the disadvantage, however, of being prone to the production of clicks and pops due to random agitations and near-avalanching conditions. It is a purpose of the present invention to provide an arrangement in which the production of noise by a semiconductor diode may be regulated and made to yield a more nearly pure white noise.

Another and more basic purpose of the invention is to provide an improved wide band noise generator which is comprised of two impedances connected in series across a source of direct current potential, the noise signal being obtained at the center point of the series connected impedances. These impedances can be resistors, preferably of the carbon type and of equal ohmic value, or they can be semi-conductor diodes and wherein the polarity of the direct current potential is such that current flows through the diodes in their least conductive direction. In accordance with other features of the invention, the noise generator may include a vacuum tube amplifier, the noise signal being applied to the control grid of this tube for amplification and the resistor elements being mounted in heat transfer relation with heat sinks applied to the glass envelope of the amplifier tube so that the resistor elements become heated by the heat produced within the tube. It is a further feature of the invention to connect a capacitor, which may be made variable, between the plate and grid of the amplifier tube so as to provide negative feedback at high frequencies thus serving to attenuate output of such high frequencies and stabilize operation in such high frequency range. In accordance with another feature of the invention, the vacuum amplifier tube, heat sinks and resistor elements are enclosed within a shield which can be thermally insulated for the purpose of increasing and/or stabilizing the temperatures of the components therein.

The foregoing objects and advantages inherent in the invention will become more apparent from the following detailed description of certain preferred embodiments thereof and from the accompanying drawings wherein.

Figure 1:
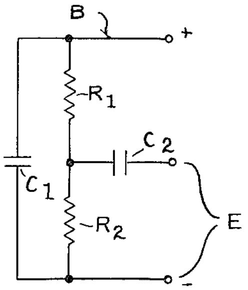
FIG. 1 is an electrical schematic wiring diagram illustrating the basic circuit arrangement utilizing carbon resistors for generating the noise which is thereafter amplified.

With reference now to FIG. 1 it is seen that the improved noise generator in accordance with the invention includes two resistance elements R1 and R2 conected in series across a source of direct current potential B, and that the series resistance arrangement is shunted by a capacitance C1. If C1 is made sufficiently large, its reactive value will place point B, which is the positive and hence non-grounded end of the series connected resistances, at essentially ground potential for all audio frequencies. This places the resistances R1 and R2 in parallel conection for all frequencies above a few cycles per second. The value of R which should be substituted into Equation 3 is thus the equivalent resistance of the parallel combination of R1 and R2:

$$R=\left(\frac{R1\times R2}{R1+R2}\right)$$

The maximum value of this term occurs when the resistances are equal, that is, when $R1=R2$. It is seen in FIGURE 1 that this condition offers a further advantage, in that any hum or noise voltages at point B are added at equal levels but out of phase at the center point of the series resistance combination, and are thus cancelled. Thus one of the serious disadvantages of previous inventions is overcome. It is further found that any clicks and pops which occur within one resistance due to agitation or avalanche are dampened and in some cases cancelled by the presence of the other resistance in A.C. parallel with it.

In order to maximize the value of E determined by Equation 3 it is desirable to maximize the value of R consistent with high values of T and I. The temperature of the resistances, T, should be as high as possible consistent with stable operation and long life. IR heating in the resistances may yield a suitably high value of T if the wattage ratings of R1 and R2 be chosen to offer suitable heat dissipation. In a typical embodiment of the invention a supply potential "B" of 250 volts D.C. is used. It is found that two standard ½ watt carbon resistors of 250,000 ohms each will provide suitable values for R1 and R2. The noise signal voltage E produced by the resistances is coupled to amplifying circuits through blocking capacitor C2.

Figure 2:
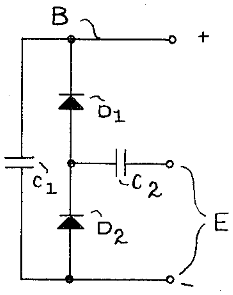
FIG. 2 is also an electrical schematic diagram similar to FIG. 1 but wherein diodes are substituted for the carbon resistors.

FIGURE 2 illustrates the use of two semiconductor diodes D1 and D2 in lieu of resistances R1 and R2. The operation of this circuit is exactly as described above, with the exceptions that the operating temperatures of the diodes need not be high for adequate noise generation, and that the direct current supply potential "B" may be less than that used with resistances. As in the case of the resistances, the use of series-connected diodes results in a noise signal free of hum, clicks, and pops, which fact represents a marked improvement over previously described systems.

Figure 3:
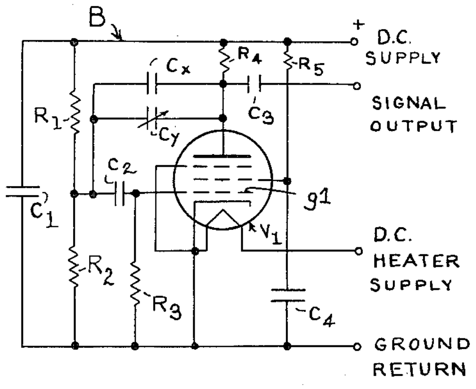
FIG. 3 is a schematic diagram of one complete amplifier circuit suitable for amplifying the output of the noise generators of either FIGS. 1 or 2.

FIGURE 3 illustrates an amplifier suitable for use with the noise generators of FIGURES 1 and 2. Here the noise signal voltage produced at the center point of the series combination R1, R2 is applied to the control grid of a pentode vacuum tube V1 through capacitor C2. In the vacuum tube, which may be of the 6AU6 type, the noise voltage present on the control grid *g1* causes a correlated variation in the flow of current through the plate circuit of the tube, and thus causes an amplified noise signal to be present on the output side of C3, the output blocking capacitor.

In order to keep hum and spurious noise components to a minimum, it is necessary to use the standard precautions. A direct current source of heater voltage should be employed, as should also careful shielding of the circuit from external hum fields.

Figure 4:
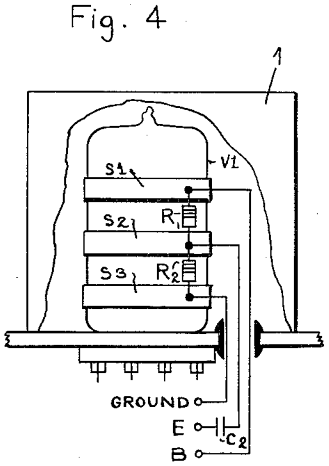
FIG. 4 is a view partly in elevation and partly in section illustrating a particularly advantageous physical arrangement for the amplifier tube and the noise generator elements.

Equation 3 indicates that the ambient temperature of the noise-generating resistances should be maintained as high as possible consistent with stable operation. It is thus desirable to provide a source of heating for these resistances. A conveniently appropriate source of such heating is the bulb of the vacuum tube used for amplifying the noise voltage. The bulb heat, which is generated by the heater, cathode, screen, and plate currents in the tube, may be mechanically transferred to the resistors by means of the heat sinks S1, S2, and S3 shown in FIGURE 4. These heat sinks may be high conductivity copper bands which fit snugly over the tube bulb. Spring expansion kinks are formed into the bands providing tight coupling to the bulb, while protecting the tube bulb from damage during warmup expansion. The temperature of the resistances may be further increased and/or stabilized by surrounding the tube and heat sink assembly with a mu-metal or iron shield 1 which may be lined with an insulating substance such as glass wool. This apparatus further serves to shield the circuit elements from hum and other fields.

The small capacity *Cx* formed between the plate of tube V1 and S2 provides a negative feedback path between the tube's plate and grid, giving a roll-off of output at very high frequencies, and thus tending to stabilize operation at these frequencies. Should it be desired to further limit the high frequency output of the noise generator, suitable capacitances *Cy* may be connected in parallel with this small capacitance *Cx*. Thus, for instance, if noise only within the audio spectrum is desired, a small value of *Cy* may be employed. If a variable capacitor *Cy* is used, an effective tone control results, and so called "grey noise," that is, white noise with attenuated high frequencies, is produced.

In conclusion, while we have described and illustrated certain embodiments for our improved electrical noise generator it is to be understood that various modifications may be made in the construction and arrangement of components without, however, departing from the spirit and scope of the invention as defined in the appended claims.

We claim:

1. Apparatus for generating a noise signal constituted by a wide band of frequencies comprising a pair of impedance elements connected in series across a source of direct current potential having one side grounded, a tap at the center point of said series connected impedances for taking off the noise signal, and a capacitor connected in parallel with said series connected impedances, said capacitor having a reactance value sufficiently large to place the non-grounded end of said series connected impedances at essentially ground potential for substantially all audio frequencies.

2. Apparatus as defined in claim 1 wherein said series connected impedance elements are constituted by resistors.

3. Apparatus as defined in claim 2 wherein said resistors are of the carbon type.

4. Apparatus as defined in claim 2 wherein said series connected impedance elements are constituted by resistors having equal ohmic values.

5. Apparatus for generating a noise signal constituted by a wide band of frequencies comprising a pair of carbon type resistors of equal ohmic value connected in series across a source of direct current potential having one side grounded, a tap at the center point of said series connected resistors for taking off the noise signal, and a capacitor connected in parallel with said series connected resistors, said capacitor having a reactance value sufficiently large to place the non-grounded end of said series connected resistors at essentially ground potential for substantially all audio frequencies.

6. Apparatus for generating a noise signal constituted by a wide band of frequencies comprising a pair of semiconductor diodes connected in series across a source of direct current potential having one side grounded, the polarity of said potential being such that current flows in the least conductive direction through said diodes, a tap at the center point of said series connected diodes for taking off the noise signal, and a capacitor connected in parallel with said series connected diodes, said capacitor having a reactance value sufficiently large to place the non-grounded end of said series connected diodes at essentially ground potential for substantially all audio frequencies.

7. Apparatus as defined in claim 1 and which further includes amplifying means constituted by a vacuum tube amplifier including a second capacitor connected between the plate and grid of said amplifier tube to provide negative feedback at high frequencies thus serving to attenuate output of such frequencies and also serving to stabilize operation at such frequencies.

8. Apparatus as defined in claim 7 wherein said second capacitor is made variable to permit variation in the amount of said negative feedback and thus provide variable attenuation of high frequencies produced by the apparatus.

9. Apparatus for generating a noise signal constituted by a wide band of frequencies comprising a pair of resistor elements connected in series across a source of direct current potential, said noise signal being obtained at the center point of said series connected resistor elements, an electronic amplifier unit including spaced cathode and anode elements and a control grid therebetween for controlling current flow between said cathode and anode, all of said elements being housed within a glass envelope, circuit means connecting said anode and cathode elements across said source of direct current potential and metallic heat sinks mounted upon said glass envelope in spaced relation, said noise signal being connected to the control grid of said amplifier unit and said resistor elements being mounted in heat transfer relation with said heat sinks so as to become heated by the heat produced within said envelope and which is transferred to said heat sinks.

10. Apparatus as defined in claim 9 wherein said amplifier unit and heat sinks and resistor elements are enclosed within a shield for controlling the temperatures thereof.

References Cited by the Examiner

UNITED STATES PATENTS

| | | | |
|---|---|---|---|
| 1,859,103 | 5/32 | Minnium | 330—78 |
| 2,773,186 | 12/56 | Herrmann | 331—78 |
| 2,974,424 | 3/61 | Roberts | 331—78 |

ROY LAKE, *Primary Examiner.*

JOHN KOMINSKI, *Examiner.*